(12) United States Patent
Burckart et al.

(10) Patent No.: US 7,853,688 B2
(45) Date of Patent: Dec. 14, 2010

(54) METHOD AND SYSTEM FOR PROACTIVELY MONITORING THE COHERENCY OF A DISTRIBUTED CACHE

(75) Inventors: Erik John Burckart, Raleigh, NC (US); Ching Chi Chow, Cary, NC (US); Andrew Ivory, Durham, NC (US); Rohit Dilip Kelapure, Durham, NC (US); Aaron Kyle Shook, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 11/745,152

(22) Filed: May 7, 2007

(65) Prior Publication Data

US 2008/0282039 A1     Nov. 13, 2008

(51) Int. Cl.
*G06F 15/173* (2006.01)
*G06F 17/00* (2006.01)
(52) U.S. Cl. .................. 709/224; 707/634; 711/141
(58) Field of Classification Search ................ 709/224; 707/634; 711/141
See application file for complete search history.

(56) References Cited

U.S. PATENT DOCUMENTS

| | | | | |
|---|---|---|---|---|
| 6,813,633 | B2* | 11/2004 | Wong et al. | 709/217 |
| 6,976,205 | B1* | 12/2005 | Ziai et al. | 714/807 |
| 7,636,767 | B2* | 12/2009 | Lev-Ran et al. | 709/218 |
| 2004/0235523 | A1* | 11/2004 | Schrire et al. | 455/558 |

* cited by examiner

*Primary Examiner*—Larry Donaghue
(74) *Attorney, Agent, or Firm*—Dillon & Yudell LLP

(57) ABSTRACT

A method of proactively monitoring the coherency of distributed cache. A cache comparison utility selects a set of cache keys from a replica cache connected to a main cache via a network. The cache comparison utility selects a first cache key from the set of cache keys and fetches a first cache value from the replica cache that corresponds to the first cache key. The cache comparison utility generates a first checksum value corresponding to the first cache value and the first cache key and stores the first checksum value in a first checksum table. The cache comparison utility creates a first total checksum value that corresponds to the first checksum table and compares the first total checksum value with multiple total checksum values that correspond to the main cache and one or more additional replica caches, thereby identifying replica caches that are not identical to the main cache.

6 Claims, 3 Drawing Sheets

METHOD AND SYSTEM FOR PROACTIVELY MONITORING THE COHERENCY OF A DISTRIBUTED CACHE

BACKGROUND OF THE INVENTION

The present invention relates in general to data processing systems and in particular to distributed caches. Still more particularly, the present invention relates to an improved method and system for proactively monitoring the coherency of a distributed cache.

Distributed applications utilize multiple interconnected caches to improve performance characteristics, such as response time. Distributed caches are typically located in multiple servers. Ideally, each cache within a distributed cache system is identical. However, users may often want to check one or more caches to ensure that the caches are all identical (e.g., when troubleshooting a problem).

Conventional methods of comparing caches, such as comparing the overall sizes of the caches and/or comparing multiple cache keys within each cache, are not completely accurate. These conventional methods do not take into account individual cache values that may have been changed independently of the cache keys. Other conventional cache comparison methods, such as comparing all values within each cache individually, are very thorough but also take a lot of time to execute. Furthermore, the time required to thoroughly compare all individual values increases dramatically as the number of caches being compared increases.

SUMMARY OF AN EMBODIMENT

Disclosed are a method, system, and computer storage medium for proactively monitoring the coherency of a distributed cache. A cache comparison utility selects a set of cache keys from a replica cache connected to a main cache via a network. The cache comparison utility selects a first cache key from the set of cache keys and fetches a first cache value from the replica cache that corresponds to the first cache key. The cache comparison utility generates a first checksum value corresponding to the first cache value and the first cache key and stores the first checksum value in a first checksum table. The cache comparison utility creates a first total checksum value that corresponds to the first checksum table and compares the first total checksum value with multiple total checksum values that correspond to the main cache and one or more additional replica caches, thereby identifying any replica caches that are not identical to the main cache.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer storage medium for proactively monitoring the coherency of a distributed cache.

Figure 1:
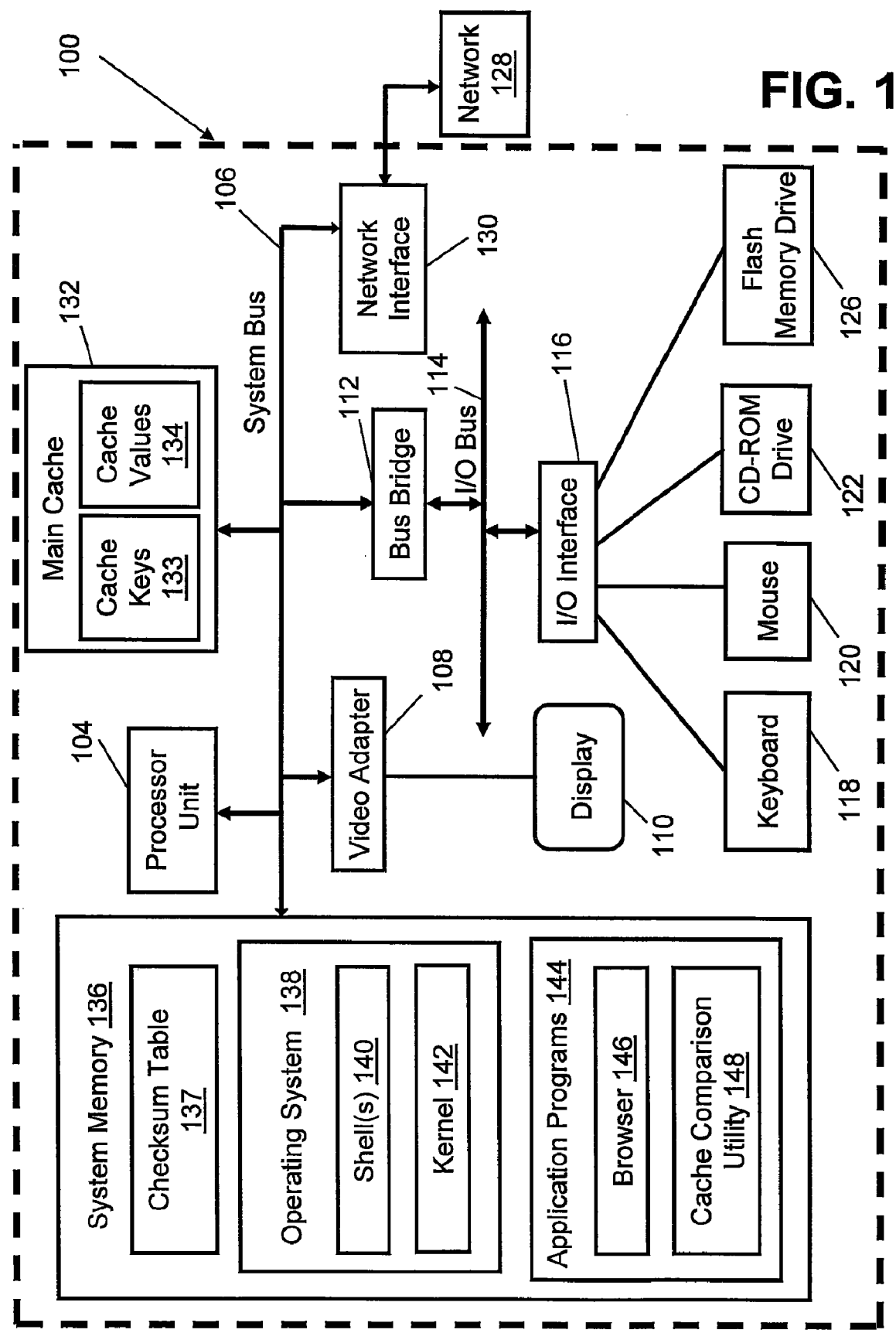
FIG. 1 depicts a high level block diagram of an exemplary server, according to an embodiment of the present invention.

With reference now to FIG. 1, there is depicted a high level block diagram of an exemplary server, according to an embodiment of the present invention. Main server 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Main server 100 is able to communicate with a network 128 using a network interface 130, which is coupled to system bus 106. Network 128 may be an external network such as the Internet, or an internal network such as an Ethernet, Local Area Network (LAN), or a Virtual Private Network (VPN).

A main cache 132 is also coupled to system bus 106. Main cache 132 includes multiple cache keys 133, which correspond to one or more cache values 134. A system memory 136 is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes a checksum table 137, an operating system (OS) 138 and application programs 144. In another embodiment, main cache 132 may be included within system memory 136.

OS 138 includes a shell 140, for providing transparent user access to resources such as application programs 144. Generally, shell 140 (as it is called in UNIX® ( ) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., main server 100) to send and receive network messages to the Internet. Main server 100 may utilize HyperText Transfer Protocol (HTTP) messaging to enable communication with network 128. Application programs 144 in system memory 136 also include cache comparison utility 148. Cache comparison utility 148 performs the functions illustrated in FIG. 3, which is discussed below.

The hardware elements depicted in main server 100 are not intended to be exhaustive, but rather represent and/or highlight certain components that may be utilized to practice the present invention. For instance, main server 100 may include alternate memory storage devices such as magnetic cassettes, Digital Versatile Disks (DVDs), Bernoulli cartridges, and the like. These and other variations are intended to be within the spirit and scope of the present invention.

Figure 2:
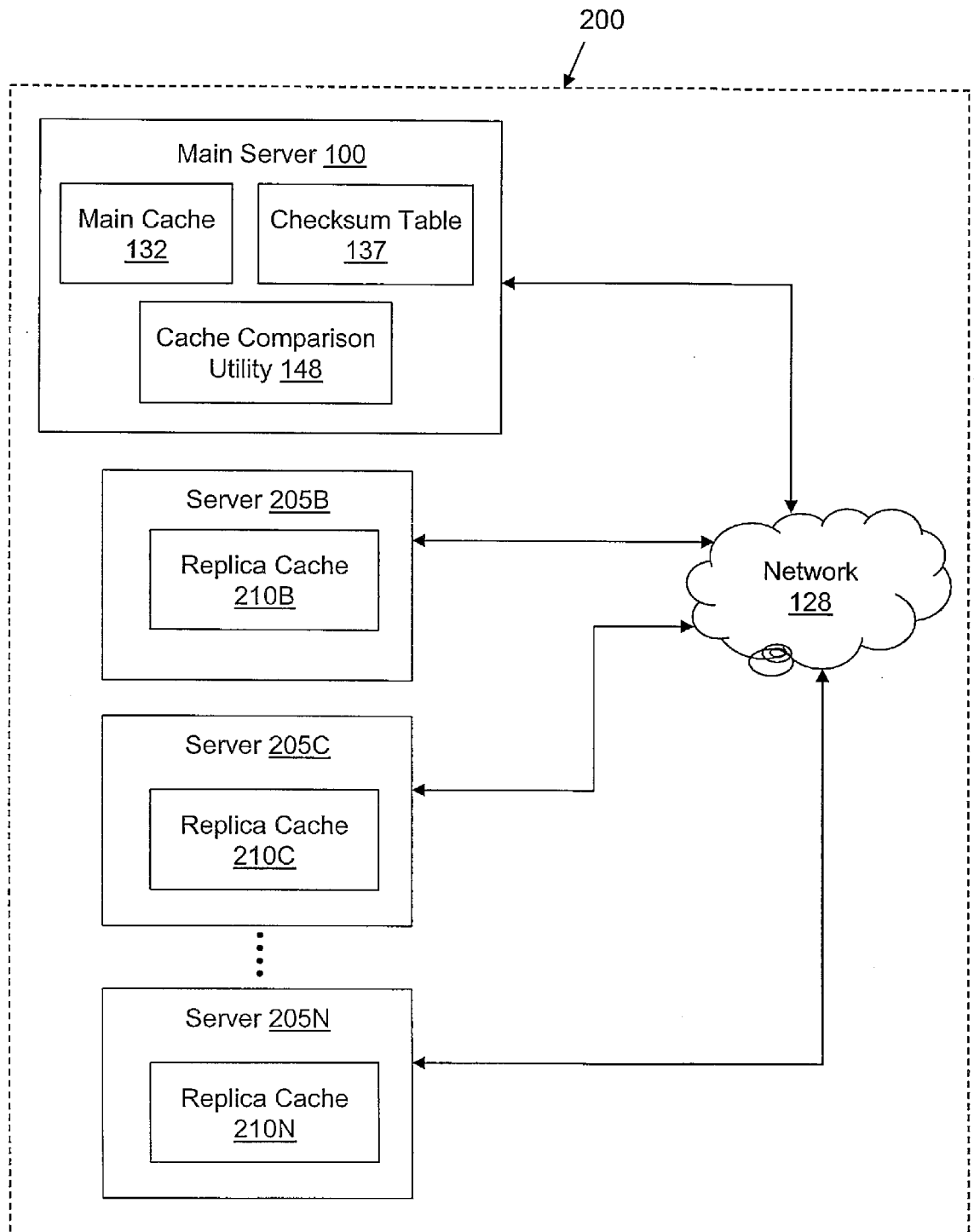
FIG. 2 illustrates an exemplary distributed cache system, according to an embodiment of the present invention.

With reference now to FIG. 2, there is depicted an exemplary distributed cache system, according to an embodiment of the present invention. As shown, distributed cache system 200 includes main server 100 and multiple additional servers, including, but not limited to, servers 205B through 205N, where N is an integer. Servers 205B through 205N, which are configured with architecture substantially similar to main server 100, are each connected to network 128. Servers 205B through 205N each contain a replica cache 210B through 210N, respectively. According to the illustrative embodiment, replica caches 210B through 210N are identical to main cache 132 (i.e., replica caches 210B through 210N ideally contain the same cache keys 133 and corresponding cache values 134 as main cache 132). Cache comparison utility 148 utilizes checksum table 137 to compare main cache 132 and replica caches 210B through 210N, according to the method illustrated in FIG. 3, which is discussed below.

Figure 3:
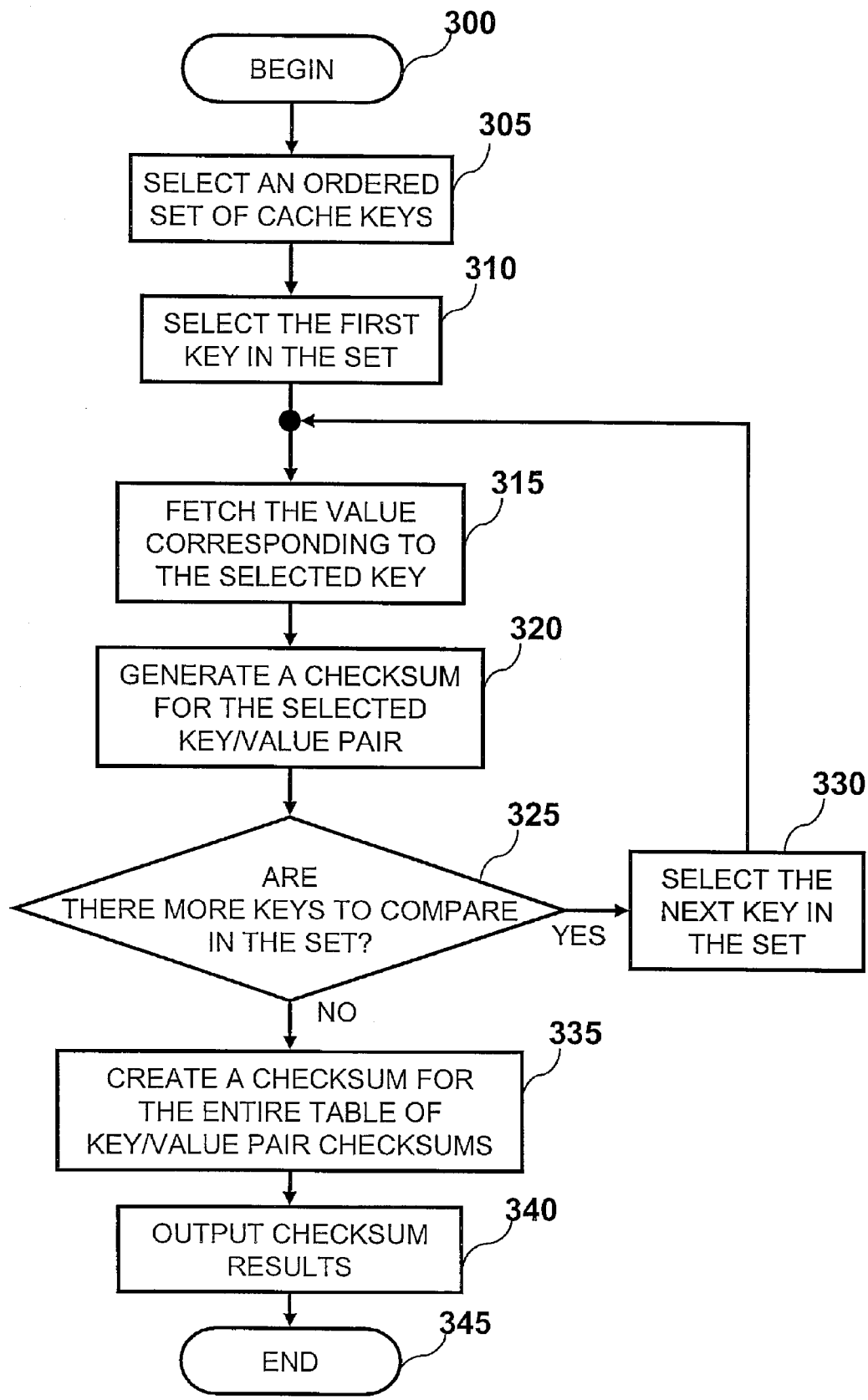
FIG. 3 is a high level logical flowchart of an exemplary method of monitoring the coherency of a distributed cache, according to an embodiment of the invention.

Turning now to FIG. 3, there is illustrated a high level logical flowchart of an exemplary method of monitoring the coherency of a distributed cache, according to an embodiment of the invention. The process begins at block 300 in response to a user of main server 100 initiating a cache comparison. Cache comparison utility 148 selects an ordered set of cache keys from a cache that is being compared to main cache 132 (e.g., the cache keys in replica cache 210B), as depicted in block 305. Cache comparison utility 148 selects the first cache key from the selected set of cache keys, as shown in block 310. Cache comparison utility 148 fetches the value from the replica cache that corresponds to the selected cache key, as depicted in block 315. Cache comparison utility 148 subsequently generates a checksum for the selected cache key/value pair and stores the checksum in checksum table 137, as shown in block 320. As utilized herein, a checksum refers to a numerical value calculated by adding up the bits of a data item, such as a cache key and/or a cache value. The checksums for identical data items are identical. A user may thus utilize checksums to determine whether multiple data sets (i.e., replica caches) contain identical data.

At block 325, cache comparison utility 148 determines whether the cache being compared to main cache 132 contains additional cache keys that have not yet been compared to cache keys 133. If all cache keys within the selected set of cache keys have not yet been compared to cache keys 133, cache comparison utility 148 selects a next (i.e., un-compared) cache key from the set of selected cache keys, as shown in block 330, and the process returns to block 315. If all cache keys within the selected set of cache keys have been compared to cache keys 133, cache comparison utility 148 creates a checksum for the entire table of cache key/value pairs, as depicted in block 335. Cache comparison utility 148 outputs the checksum results (e.g., via display 110), as shown in block 340, and the process terminates at block 345.

In another embodiment, cache comparison utility 148 may repeat the cache comparison process illustrated in FIG. 3, which is discussed above, until cache comparison utility 148 generates checksums for all cache key/value pairs within multiple replica caches (210B through 210N). In yet another embodiment, cache comparison utility 148 may utilize a graphical user interface (GUI) to display the generated checksums and/or overall comparison results to a user of main server 100.

The present invention thus provides a method of proactively monitoring the coherency of a distributed cache. Cache comparison utility 148 selects a set of cache keys from a replica cache connected to main cache 132 via network 128. Cache comparison utility 148 selects a first cache key from the set of cache keys and fetches a first cache value from the replica cache that corresponds to the first cache key. Cache comparison utility 148 generates a first checksum value corresponding to the first cache value and the first cache key and stores the first checksum value in a first checksum table. Cache comparison utility 148 creates a first total checksum value that corresponds to the first checksum table and compares the first total checksum value with multiple total checksum values that correspond to main cache 132 and one or more additional replica caches, thereby identifying any replica caches that are not identical to main cache 132.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 3) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional server computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   selecting a set of cache keys from a replica cache connected to a main cache through a network;
   selecting a first cache key from among said set of cache keys;
   fetching a first cache value from said replica cache that corresponds to said first cache key;
   generating a first checksum value that corresponds to said first cache value and said first cache key;
   storing said first checksum value in a first checksum table;
   creating a first total checksum value that corresponds to said first checksum table; and
   comparing said first total checksum value with a plurality of additional total checksum values that corresponds to said main cache and one or more additional replica caches.

2. The method of claim 1, wherein comparing said first total checksum value with said plurality of additional total checksum values further comprises identifying one or more of said plurality of additional total checksum values that are not equal to said first total checksum value.

3. A server computer system comprising:
   a processor unit;
   a network interface coupled to said processor unit;
   a main cache coupled to said processor unit, wherein said main cache includes a plurality of cache keys and a plurality of cache values;
   a system memory coupled to said processor unit, wherein said system memory includes a cache comparison utility that provides the functions of:
      selecting a set of cache keys from a replica cache connected to said main cache through said network interface;
      selecting a first cache key from among said set of cache keys;
      fetching a first cache value from said replica cache that corresponds to said first cache key;
      generating a first checksum value that corresponds to said first cache value and said first cache key;
      storing said first checksum value in a first checksum table;
      creating a first total checksum value that corresponds to said first checksum table; and
      comparing said first total checksum value with a plurality of additional total checksum values that correspond to said main cache and one of more additional replica caches.

4. The server computer system of claim 3, wherein said cache comparison utility further comprises means for identifying one of more of said additional replica caches that are not identical to said main cache.

5. A computer storage medium encoded with a computer program that, when executed, performs the steps of:
   selecting a set of cache keys from a replica cache connected to main cache through a network;
   selecting a first cache key from among said set of cache keys;
   fetching a first cache value from said replica cache that corresponds to said first cache key;
   generating a first checksum value that corresponds to said first cache value and said first cache key;
   storing said first checksum value in a first checksum table;
   creating a first total checksum value that corresponds to said first checksum table; and
   comparing said first total checksum value with a plurality of additional total checksum values that correspond to said main cache and one or more additional replica caches.

6. The computer storage medium of claim 5 wherein said code for comparing said first total checksum value with said plurality of additional total checksum values further comprises code for identifying one or more of said plurality of additional total checksum values that are not equal to said first total checksum value.

* * * * *